US012612149B2

(12) United States Patent
Quintin

(10) Patent No.: US 12,612,149 B2
(45) Date of Patent: Apr. 28, 2026

(54) DECOMPRESSION PANEL FOR AN AIRCRAFT AND AN INTERNAL WALL OF AN AIRCRAFT HAVING SUCH A DECOMPRESSION PANEL

(71) Applicant: Airbus Operations SAS, Toulouse (FR)

(72) Inventor: Rémi Quintin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/035,155

(22) Filed: Jan. 23, 2025

(65) Prior Publication Data

US 2025/0242905 A1    Jul. 31, 2025

(30) Foreign Application Priority Data

Jan. 26, 2024    (FR) .................................. FR2400787

(51) Int. Cl.
*B64C 1/14*          (2006.01)
*B64C 1/00*          (2006.01)

(52) U.S. Cl.
CPC ...... *B64C 1/1407* (2013.01); *B64C 2001/009* (2013.01)

(58) Field of Classification Search
CPC ............................. B64C 1/10; B64C 2001/009
See application file for complete search history.

(56) References Cited

U.S. PATENT DOCUMENTS

| | | | | |
|---|---|---|---|---|
| 6,029,933 | A * | 2/2000 | Holman | .................... B64C 1/10 |
| | | | | 244/129.4 |
| 8,240,331 | B2 * | 8/2012 | Appleby | ................. F16K 24/06 |
| | | | | 137/526 |
| 8,714,483 | B2 * | 5/2014 | Hoetzeldt | ................. B64C 1/18 |
| | | | | 244/118.5 |
| 10,279,887 | B2 * | 5/2019 | Brown | .................... B64C 1/066 |
| 2010/0096035 | A1 | 4/2010 | Appleby et al. | |
| 2013/0206909 | A1 * | 8/2013 | Pamminger | ............... B64C 1/10 |
| | | | | 244/121 |

FOREIGN PATENT DOCUMENTS

| | | | | |
|---|---|---|---|---|
| EP | | 2177434 A2 | 4/2010 | |
| WO | WO-03068598 A1 * | 8/2003 | ....... B64C 2001/009 | |

OTHER PUBLICATIONS

French Search Report and Written Opinion for corresponding French Patent Application No. 2400787 dated Aug. 14, 2024.

* cited by examiner

*Primary Examiner* — Richard Green
(74) *Attorney, Agent, or Firm* — Greer Burns & Crain Ltd.

(57)          ABSTRACT
A decompression panel includes a frame provided with an opening and a flap connected to the frame by a connecting system comprising at least one elastomer part provided with a plurality of fixing elements fixing together the elastomer part, the frame, and the flap. The flap is moved from a closed position in which it completely closes the opening to an open position in which it partially frees the opening because of the effect of a pressure difference between the two sides of the decompression panel in the event of rapid decompression.

11 Claims, 4 Drawing Sheets

DECOMPRESSION PANEL FOR AN AIRCRAFT AND AN INTERNAL WALL OF AN AIRCRAFT HAVING SUCH A DECOMPRESSION PANEL

CROSS-REFERENCES TO RELATED APPLICATIONS

This application claims the benefit of French Patent Application Number 2400787 filed on Jan. 26, 2024, the entire disclosure of which is incorporated herein by way of reference.

FIELD OF THE INVENTION

The present invention relates to a decompression panel for an aircraft and an internal wall of an aircraft provided with such a decompression panel.

BACKGROUND OF THE INVENTION

It is known that an aircraft, in particular a commercial aircraft, includes pressurized zones, notably the cabin, in which a pressure is generated that is higher than the external pressure when the aircraft is flying at high altitudes.

An aircraft generally includes a plurality of zones that are pressurized separately, such as, for example, the cabin and the hold of a commercial aircraft or the cargo zone and the mail zone of a cargo aircraft.

In the event of depressurization of one of the pressurized zones, generating a pressure difference between that zone subjected to the depressurization and an adjacent pressurized zone, decompression panels are generally provided in the wall or walls separating those two adjacent zones, in particular to prevent damage to said separating wall or walls due to this pressure difference.

Such a decompression panel has the objective of providing protection in the event of rapid decompression, that is to say in the event of rapid modification of the pressure in a zone generating a pressure difference between two adjacent zones of the aircraft. Rapid decompression may be generated by depressurization of a pressurized zone or by any other modification of the pressure in the zone concerned of the aircraft.

Such a decompression panel generally comprises a frame provided with an opening and a flap connected to the frame by a mechanical system. The flap is configured to be moved from a closed position in which it completely closes the opening to an open position in which it frees that opening, because of the effect of a pressure difference between the two sides of the panel, generated by the rapid decompression.

Decompression panels may be produced in different ways. However, all the usual decompression panels necessitate a complex mechanism with numerous mechanical parts, intended to retain the flap in the closed position, to generate its movement when it is opened, and to retain it after it is opened, so that it remains connected to the wall in which it is installed.

The drawback of such a decompression panel is that in the event of rapid decompression, it is necessary to return the flap to its closed position and to reset the retaining and opening mechanism so that it is again operational.

Thus there exists a need to find a solution for reducing and simplifying the operations on the decompression panel following rapid decompression.

SUMMARY OF THE INVENTION

The present invention has an objective of proposing a solution to address the aforementioned need. It relates to a decompression panel for an aircraft, said decompression panel comprising at least:

a frame provided with an opening; and a flap connected to the frame by a connecting system, the flap being able to assume at least one of two positions: a closed position in which it completely closes said opening and at least one open position in which it at least partially frees the opening, said flap being adapted to be moved from the closed position to the open position by the effect of a pressure difference between the two sides of the decompression panel.

In accordance with the invention, the flap and the frame are configured to be superposed over at least one superposition zone and the connecting system comprises at least one elastomer part arranged on one of the faces of said superposition zone and provided with a plurality of fixing elements passing through and fixing together the elastomer part, the frame and the flap.

Thanks to this elastomer part connecting the flap to the frame, in the event of a pressure difference between the two sides of the decompression panel, due to rapid decompression, the elastomer part is therefore compressed, which generates a movement of the flap relative to the frame in such a manner as to move it into its open position and to create a gap between these two elements enabling passage of air, which makes it possible to reduce said pressure difference and to limit the risks of damage to the separating wall.

Furthermore, when the pressure difference is reduced again, the elastomer part reverts to its initial nominal shape (because of its intrinsic elasticity), thereby returning the flap into its closed position.

Consequently, no complex mechanical mechanism or system is used, either to return the flap into the open position or to return it thereafter into its closed position, in which it is, moreover, again directly operational and reusable.

Also, after rapid decompression, no resetting action or operation is necessary, except for simple checking of the decompression panel.

Said decompression panel also has other advantages specified hereinafter.

The decompression panel is advantageously configured so that, if the pressure difference between the two sides of the frame of the decompression panel, with a lower pressure on the side of the frame where the flap is arranged, exceeds a predetermined value, the elastomer part is compressed in such a manner as to generate a movement of the flap away from the frame and thus to create an air passage between the flap and the frame.

Furthermore, each of said fixing elements advantageously passes through holes in the elastomer part, the frame and the flap in such a manner as to enable them to slide on said fixing elements and to allow the flap to be moved away from the frame, when the elastomer part is compressed by the effect of the pressure difference.

Moreover, the decompression panel is preferably configured so that the air passage created, when the flap is in the open position, has a global surface the area of which is substantially equal to the area of the surface of said opening of the frame.

In a preferred embodiment, the elastomer part is a solid, elongate part provided with a plurality of holes each intended to receive a fixing element. The elastomer part is advantageously one of the following shapes: a rectilinear shape, a curved shape.

Furthermore, in one particular embodiment, the flap has a rectangular shape and the decompression panel includes at least one pair of identical elastomer parts arranged along opposite sides of said rectangular shape.

Moreover, in a preferred embodiment, the decompression panel comprises at least one metal plate provided with holes for the fixing elements to pass through, the metal plate being arranged on a face of the elastomer part, opposite that in contact with the superposition zone.

Furthermore, the elastomer part is advantageously provided with a housing to receive the metal plate.

The present invention also relates to an aircraft internal wall, intended to be arranged between two adjacent zones, notably zones pressurized separately, of the aircraft.

In accordance with the invention, said internal wall includes at least one decompression panel as described hereinabove.

The present invention further relates to an aircraft, in particular a commercial aircraft, that includes at least one decompression panel as described hereinabove and/or at least one internal wall as described above.

BRIEF DESCRIPTION OF THE DRAWINGS

The appended figures explain how the invention can be implemented. In these figures, identical references designate similar elements.

DETAILED DESCRIPTION OF THE PREFERRED EMBODIMENTS

Figure 2:
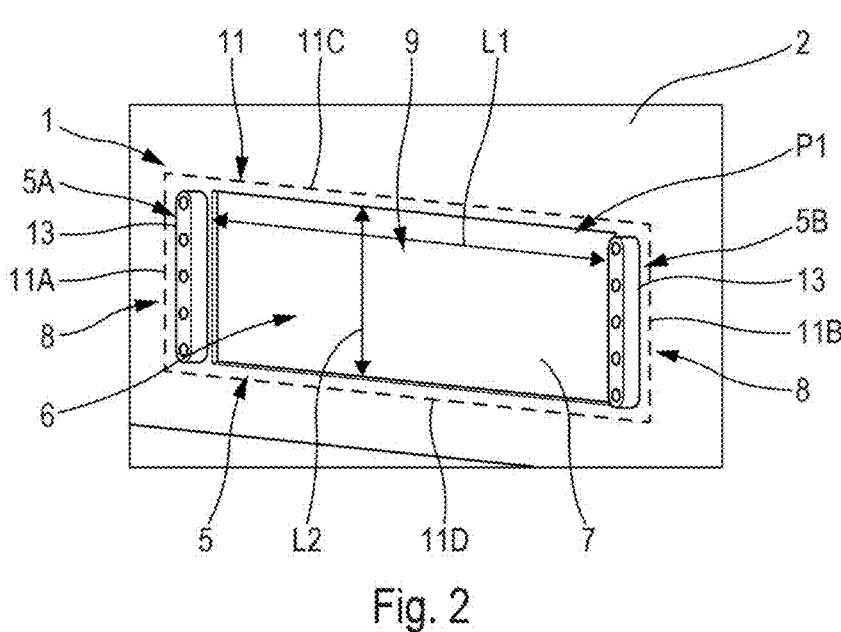
FIG. 2 represents a perspective view of a decompression panel as seen from a first side with a flap in a closed position.
Figure 3:
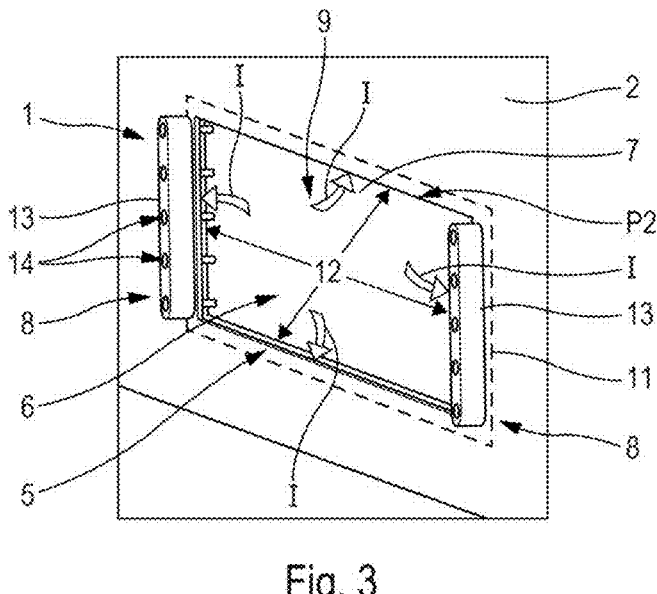
FIG. 3 is a view similar to that of FIG. 2 with the flap in an open position.
Figure 4:
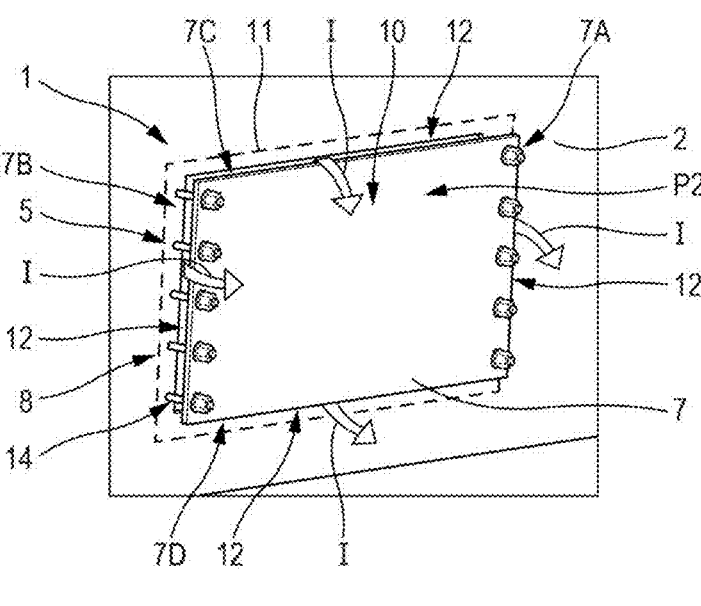
FIG. 4 is a perspective view of the decompression panel from FIG. 3 as seen from a second side opposite said first side.
Figure 8:
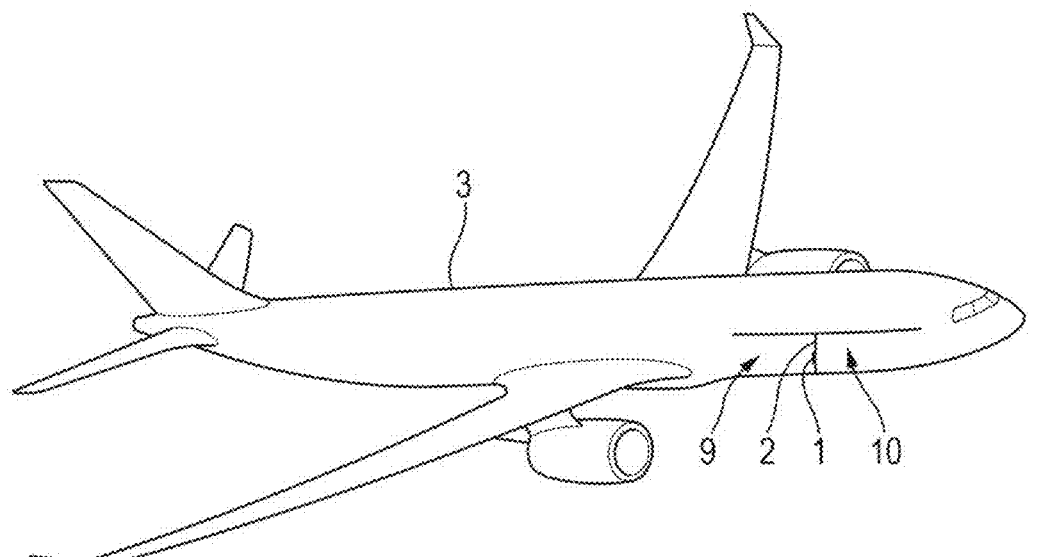
FIG. 8 is a diagrammatic perspective view of an aircraft comprising a wall provided with a decompression panel.

The decompression panel 1 illustrative of the invention represented diagrammatically in one particular embodiment in FIGS. 2 to 4 is intended to be mounted in an internal wall 2 of an aircraft 3, in particular of a commercial aircraft, as represented partially and diagrammatically in FIG. 8.

To be more precise, the decompression panel 1 is intended to be mounted in an internal wall 2 separating two adjacent zones of the aircraft, in particular two pressurized zones of the aircraft, which are pressurized separately, such as, for example, the cabin and the hold of a commercial aircraft, or the cargo zone and the mail zone of a cargo aircraft.

Figure 1:
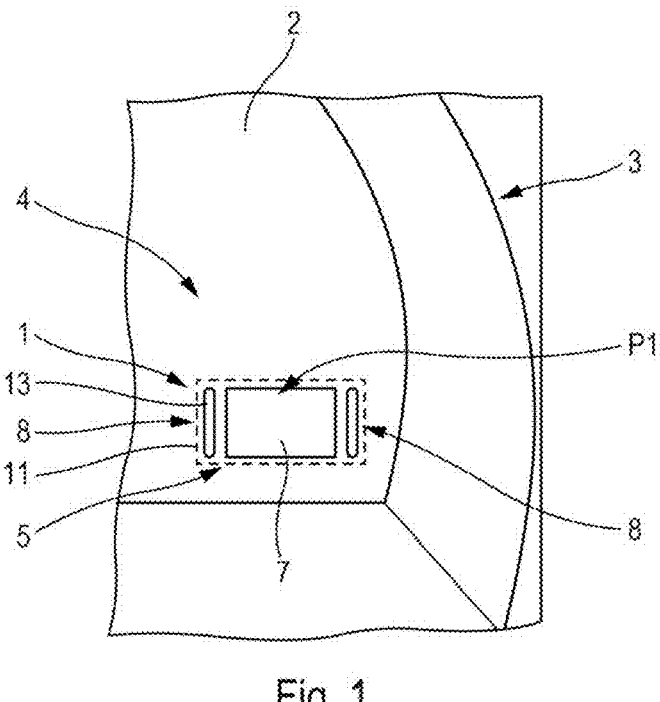
FIG. 1 is a partial perspective view of an internal part of an aircraft, showing a part of a wall fitted with a decompression panel in accordance with one embodiment of the invention.

In FIG. 1, there has been represented highly diagrammatically a part of the interior 4 of the aircraft 3, with the internal wall 2 shown partially.

The decompression panel 1 comprises, as represented in FIGS. 2 to 4, a frame 5 provided with an opening 6. The frame 5 may be a frame dedicated to producing the decompression panel 1, or, preferably, may correspond to a part of the wall 2 around the opening 6, as in the example in FIGS. 2 to 4. In this example, the opening 6 is rectangular with a length L1 and a width L2 (FIG. 2).

The decompression panel 1 that is mounted in the internal wall 2 also comprises a flap 7 connected to the frame 5 by means of a connecting system 8 described hereinafter.

The flap 7 is able to assume (alternately) one or the other of the following two positions:
  a closed position P1 in which it completely closes the opening 6, as represented in FIG. 2; and
  at least one open position P2 in which it partially frees the opening 6, as represented in FIGS. 3 and 4.

FIG. 3 corresponds to a view of one side 9 of the decompression panel 1, likewise FIG. 2, while FIG. 4 corresponds to a view of the other side 10 of the decompression panel 1.

The flap 7 is able to be moved from the closed position P1 to the open position P2 because of the effect of a pressure difference between the two sides 9 and 10 of the decompression panel 1, as described hereinafter.

Furthermore, the flap 7 has a size such that it is superposed on the frame 5, over at least one superposition zone 11 around the opening 6.

In the example in FIGS. 2 to 4, the flap 7 has a rectangular shape (comprising two short sides 7A and 7B and two long sides 7C and 7D, as shown in FIG. 4). The superposition zone 11 (which is represented by dashed lines in FIGS. 2 to 4) is provided all around the flap 7. The superposition zone 11 in which the flap 7 is superposed on the frame 5 comprises four parts 11A, 11B, 11C and 11D (FIG. 2), respectively situated at the level of the sides 7A, 7B, 7C and 7D (FIG. 4).

In its closed position P2, the flap 7 is in contact with the frame 5 over surfaces corresponding to the parts 11A, 11B, 11C and 11D (of rectangular shape) of the superposition zone 11.

Furthermore, the connecting system 8 comprises at least one elastomer part 13. In the example in FIGS. 2 to 4, the connecting system 8 comprises two parts 13. Each of the parts 13 is arranged on a respective one of the parts 11A and 11B of the superposition zone 11. The flap 7 is arranged on the side 10 of the frame 5 of the decompression panel 1 in the example in FIGS. 2 to 4. In that example, the parts 13 are arranged on the side 9 of the frame 5 of the decompression panel 1, that is to say with a face 23 (FIG. 5) in contact with a face 5A, 5B of the frame 5 (FIG. 2), respectively situated in the part 11A, 11B of the superposition zone 11. Alternatively, the parts 13 could equally well be arranged on the side 10, with their face 23 in contact with the flap 7.

Furthermore, for each of the parts 13, a plurality of fixing elements 14 pass through the elastomer part 13, the frame 5 and the flap 7 and fix together these various elements (part 13, frame 5 and flap 7).

Figure 5:
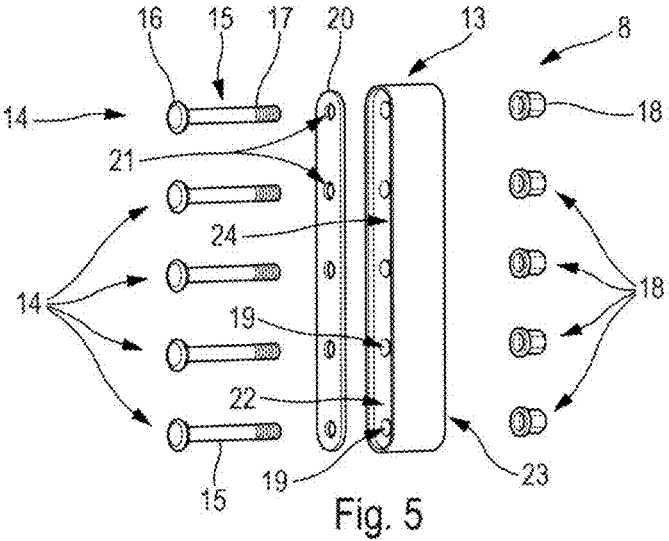
FIG. 5 is an exploded perspective view of an elastomer part and elements for fixing this elastomer part.
Figure 6:
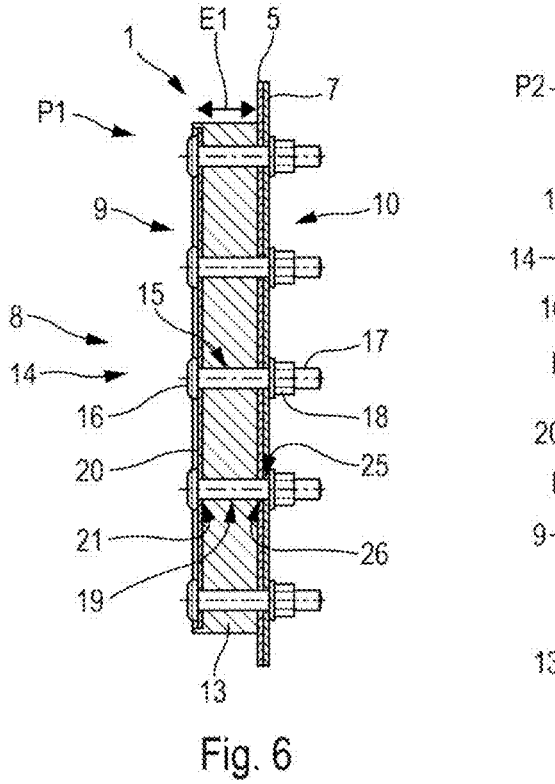
FIG. 6 is a view in cross section of a decompression panel with the flap in the closed position.

Each fixing element 14 passes through the elastomer part 13, the frame 5 and the flap 7, respectively through holes 19, 26 and 25 in these elements, allowing them to slide, as represented in FIG. 6. Each fixing element 14 preferably corresponds to a nut and bolt assembly formed, as represented in FIG. 5, by a bolt 15 provided with a head 16 and comprising a threaded shank 17, and a nut 18 able to be screwed onto the threaded shank 17 of the bolt 15.

In a preferred embodiment, the elastomer part 13 is an elongate part. The elongate part 13 may be produced in different ways. The elongate part 13 preferably has a recti-linear shape, as represented in FIGS. 1 to 5. Nevertheless, the elongate part 13 may equally well have a curved shape or a more complex shape, notably to match the shape of the opening 6 and/or of the flap 7. These various shape possi-bilities of the part 13 impart great flexibility in the produc-tion of the connecting system 8, and more generally, of the decompression panel 1.

In the embodiment depicted, the elastomer part 13 is a solid part that is provided with a plurality of holes 19 (FIG. 5) intended to receive the bolts 15 of the fixing elements 14.

In the particular embodiment in FIGS. 2 to 4, in which the flap 7 has a rectangular shape, the decompression panel 1 includes a pair of identical elastomer parts 13 arranged along opposite sides of the rectangular shape (in this instance at the level of its short sides 7A and 7B (FIG. 4)).

In a variant embodiment (not represented), the decom-pression panel may include two pairs of elastomer parts 13, of which one pair is arranged at the level of its short sides 7A and 7B and the other pair is arranged at the level of its long sides 7C and 7D.

Figure 7:
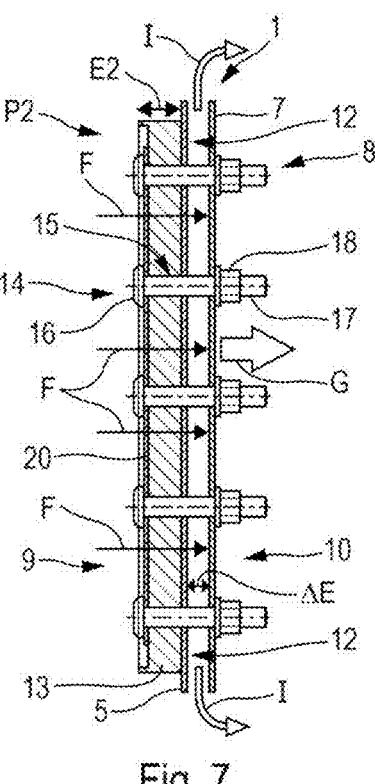
FIG. 7 is a view similar to that of FIG. 6 with the flap in the open position.

Furthermore, in a preferred embodiment, the decompres-sion panel 1 comprises a metal plate 20 (FIGS. 5, 6 and 7). This metal plate 20 is provided with holes 21 intended for the passage of the fixing elements 14. The metal plate 20 is arranged on a face 22 of the elastomer part 13 (FIG. 5), opposite the face 23 of the part 13 that is in contact with the face 5A, 5B of the superposition zone 11.

This metal plate 20 makes it possible to balance the pressure exerted by all of the fixing elements 14 (that fix the part 13) on the flap 7 and the frame 5. For each fixing element 14, the head 16 of the bolt 15 rests against the metal plate 20 and the nut 18 is in contact with the flap 7, as can be seen in FIGS. 6 and 7.

Furthermore, the elastomer part 13 is provided with a housing 24 to receive the metal plate 20. The housing 24 preferably has a depth substantially (i.e., +/−10%) equal to the thickness of the metal plate 20 and a shape similar to that of the metal plate 20. In the example in FIG. 5, the metal plate 20 has a substantially rectangular shape with slightly rounded corners. This housing 24 allows easy positioning and retention of the metal plate 20 on the part 13. When the metal part 20 is housed in the housing 24, the metal plate 20 is therefore flush with the face 22 of the part 13 so that the metal plate 20 and the part 13 form a single block with a smooth face 22.

The operation of the decompression panel 1 described hereinabove is described next with reference to FIGS. 6 and 7.

As indicated hereinabove, the flap 7 of the decompression panel 1 is able to assume the following two positions:

a closed position P1 (FIGS. 2 and 6) in which it com-pletely closes the opening 6; and at least one open position P2 (FIGS. 3, 4 and 7) in which it partially frees the opening 6.

In the nominal (initial) situation, the flap 7 is located in the closed position P1. As shown in FIG. 6, it is in contact with the frame 5 (notably the parts 11A, 11B, 11C and 11D of the superposition zone 11 surrounding the opening 6). The opening 6 in the internal wall 2 is therefore completely closed and prevents any passage of air.

The flap 7 is able to be moved from this closed position PI to the open position P2 because of the effect of a pressure difference between the two sides 9 and 10 of the decom-pression panel 1, namely because of the effect of a pressure difference corresponding to a higher pressure on the side 9 than on the side 10, caused notably by rapid decompression, due for example to depressurization of the pressurized zone situated on the side 10 of the internal wall 2.

To be more precise, the decompression panel 1 is con-figured so that, if the pressure difference between the two sides 9 and 10 of the decompression panel 1 exceeds a predetermined value, the elastomer part 13 is compressed by the effect of this pressure difference on the flap 7.

This predetermined pressure difference value depends, notably, on the features of the wall 2 and of the aircraft 3. By way of illustration only, this predetermined value (of the pressure difference between the two sides 9 and 10 of the internal wall 2) may be of the order of 40 hPa.

To be more precise, the frame 5 being fixed (rigidly fastened to the wall 2), the higher pressure on the side 9 generates a force that acts on the flap 7, in the direction depicted by arrows F in FIG. 7. This force is transmitted via the fixing elements 14 to the metal plate 20 that acts on and compresses the elastomer part 13 (retained by the frame 5). This compression generates a movement, in the direction depicted by an arrow G in FIG. 7, of the flap 7 (the distance of which from the metal plate 20, which moves during compression, remains constant) which is therefore moved into its open position P2.

By this movement of the flap 7 relative to the fixed frame 5, in the direction of the arrow G, a passage 12 (FIGS. 3, 4 and 7) is created between the flap 7 and the frame 5, through which is produced a flow of air from the side 9 to the side 10 (because of the pressure difference), as depicted by arrows I in FIGS. 3, 4 and 7.

This flow of air enables reduction of the pressure differ-ence between the two sides 9 and 10 of the wall 2.

Being compressed, the thickness of the part 13 goes from a value E1 (FIG. 6) to a value E2 (FIG. 7) less than the value E1. The passage 12 therefore has a width $\Delta E$ (with $\Delta E = E1 - E2$). Because of the arrangement of two identical parts 13 on respective opposite sides of the opening 6, this width $\Delta E$ of the passage 12 is substantially the same all around the opening 6.

In a preferred embodiment, the decompression panel 1 is configured so that the air passage 12 created when the flap 7 is in the open position P2 has a global surface S2 the area A2 of which is substantially equal to the area A1 of the surface S1 of said opening 6 of the frame 5. The surface S1, which is of rectangular shape with sides of lengths L1 and L2, therefore has an area A1 that satisfies the following equation $A1 = L1 \cdot L2$.

The area A2 of the global surface S2 of the air passage 12 corresponds to the sum of the areas of the surfaces between the frame 5 and the edges of the flap 7 in the open position P2, namely a surface with an area substantially equal to $L2 \cdot \Delta E$ of the short side 7A of the flap 7, a surface with an area substantially equal to $L2 \cdot \Delta E$ of the short side 7B of the flap 7, a surface with an area substantially equal to $L1 \cdot \Delta E$ of the long side 7C of the flap 7, and a surface with an area substantially equal to $L1 \cdot \Delta E$ of the long side 7D of the flap 7. The area A2 of the global surface S2 therefore substan-tially satisfies the equation $A2 = 2 \cdot (L1 + L2) \cdot \Delta E$.

In this preferred embodiment, the decompression panel 1 and notably the part or parts 13 is or are configured so that the thickness difference $\Delta E$ (of the open position P2 relative to the closed position P1) enables a surface S2 to be obtained the area A2 of which is substantially equal to the area A1 of the surface S1.

In this preferred embodiment, the decompression panel 1 therefore allows substantially the same flow of air to circu-late (and therefore substantially the same efficacy of pres-sure difference reduction) as if the flap 7 were completely removed and/or were to free the opening completely, as is generally the case in the usual solutions.

When the pressure difference (between the two sides 9 and 10 of the decompression panel 1) is again sufficiently small, for example when the aircraft descends (and is situated at a higher external pressure) so that the pressure on the side 10 (which is close to the external pressure in the event of depressurization of the zone situated on said side 10) increases and approaches that on the side 9, the elastomer part 13 returns to its initial shape because of its intrinsic elasticity characteristics, which returns the flap 7 into its closed position P1.

The opening 6 in the internal wall 2 is therefore closed again.

Furthermore, in this closed position P1, the decompression panel 1 is again directly operational.

Consequently, no mechanical system or mechanism is used, either to move the flap 7 into the open position P2, or to return it thereafter into its closed position P1, in which it is again directly operational. Also, after rapid decompression, no resetting action or operation is necessary, except for simply checking the decompression panel 1.

The decompression panel 1 also has other advantages. In particular:

it has a low cost;

it can be produced simply and rapidly;

it allows the passage of a flow of air similar to that of a usual solution for which the flap is completely removed from the opening;

it has fewer parts compared to the usual solutions (generally provided with complex mechanisms with numerous mechanical parts); and it necessitates only a short checking or inspection time.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A decompression panel for an aircraft, the decompression panel comprising:

a frame provided with an opening; and a flap having a shaped defined by a plurality of edges and connected to the frame by a connecting system, the flap configured to assume at least one of two positions, a closed position in which the flap completely closes said opening and an open position in which the flap at least partially frees the opening, the flap configured to be moved from the closed position to the open position by a pressure difference between two sides of the decompression panel, wherein the flap and the frame are configured to be superposed over at least one superposition zone, wherein the connecting system comprises at least one elastomer part arranged on a face of the at least two superposition zones and a plurality of fixing elements passing through and fixing together the at least one elastomer part, the frame, and the flap, the at least one elastomer part shaped to conform to at least a portion of a shape of the opening or the flap, wherein, during a decompression event, the at least one elastomer part is configured to compress to transition the flap into the open position from the closed position to allow a fluid to pass through the opening past all edges from the plurality of edges of the flap, and wherein, during a compression event, the at least one elastomer part is configured to expand to transition the flap into the closed position from the open position to prohibit fluid from passing through the opening.

2. The decompression panel according to claim 1, wherein the decompression panel is configured so that, when the pressure difference between the two sides of the frame of the decompression panel, with a lower pressure on a side of the frame where the flap is arranged, exceeds a predetermined value, the elastomer part is compressed so as to generate a movement of the flap away from the frame and to create an air passage between the flap and the frame.

3. The decompression panel according to claim 2, wherein each of said fixing elements passes through holes in the elastomer part, the frame, and the flap in such a manner as to enable the elastomer part, the frame, and the flap to slide on said fixing elements and to allow the flap to be moved away from the frame, when the elastomer part is compressed by the pressure difference.

4. The decompression panel according to claim 2, wherein the decompression panel is configured so that the air passage created, when the flap is in the open position, has a global surface an area of which is substantially equal to an area of a surface of said opening of the frame.

5. The decompression panel according to claim 1, wherein the elastomer part is a solid, elongate part provided with a plurality of holes each configured to receive a fixing element.

6. The decompression panel according to claim 1, wherein the flap has a rectangular shape, and wherein the decompression panel includes at least one pair of identical elastomer parts arranged along opposite sides of the rectangular shape.

7. The decompression panel according to claim 1, further comprising:

at least one metal plate provided with holes for the fixing elements to pass through, the metal plate arranged on a face of the elastomer part, opposite a second face in contact with the superposition zone.

8. The decompression panel according to claim 7, wherein the elastomer part is provided with a housing to receive the metal plate.

9. An aircraft internal wall configured to be arranged between two adjacent zones of the aircraft, the aircraft internal wall comprising:

the decompression panel according to claim 1.

10. An aircraft comprising:

the decompression panel according to claim 1.

11. The decompression panel according to claim 1, wherein the at least one elastomer part comprises a rectilinear shape.

* * * * *